United States Patent
Van Duyn et al.

(10) Patent No.: US 10,197,436 B2
(45) Date of Patent: *Feb. 5, 2019

(54) FLUID PULSE DEVICE AND METHOD OF EXCITING GAS TURBINE ENGINE TUROMACHINERY COMPONENTS

(71) Applicant: United Technologies Corporation, Farmington, CT (US)

(72) Inventors: Keven G. Van Duyn, Bloomfield, CT (US); Richard W. Monahan, Farmington, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 200 days.

This patent is subject to a terminal disclaimer.

(21) Appl. No.: 15/243,160

(22) Filed: Aug. 22, 2016

(65) Prior Publication Data

US 2018/0052040 A1 Feb. 22, 2018

(51) Int. Cl.
*F15B 21/12* (2006.01)
*F16K 31/122* (2006.01)
(Continued)

(52) U.S. Cl.
CPC .............. *G01H 1/006* (2013.01); *F01D 5/26* (2013.01); *F15B 21/12* (2013.01); *F16K 31/004* (2013.01);
(Continued)

(58) Field of Classification Search
CPC .... G10K 11/161; G01M 7/027; G01M 15/14; F15B 21/12; F01D 5/26; F16K 31/004;
(Continued)

(56) References Cited

U.S. PATENT DOCUMENTS

| 5,193,495 A * | 3/1993 | Wood, III | F01L 9/02 123/90.12 |
| 6,739,293 B2 * | 5/2004 | Turner | F01L 9/02 123/90.11 |

(Continued)

FOREIGN PATENT DOCUMENTS

| DE | 2159457 B | 10/1972 |
| WO | 2013058704 A1 | 4/2013 |

OTHER PUBLICATIONS

European Search Report for Eurpoean Application No. 17187187.4 dated Jan. 23, 2018, 8 pages.

*Primary Examiner* — J M Saint Surin
(74) *Attorney, Agent, or Firm* — Cantor Colburn LLP

(57) ABSTRACT

A fluid pulse device includes a piezo actuated valve, a piezo injector, a delivery system, and a control system. The piezo actuated valve has a valve body, a tube, and a piston assembly. The valve body defines a first opening, a second opening, and a valve cavity that is disposed between the first opening and the second opening. The tube extends from the valve body. The piston assembly includes a piston head and a stem that is connected to the piston head. The piezo injector has an injector tip that extends through the first opening. The delivery system is fluidly connected to the piezo injector. The control system is operatively connected to the piezo injector and is configured to actuate the piezo injector to provide a fluid pulse.

17 Claims, 3 Drawing Sheets

(51) Int. Cl.
  *G01M 7/02*   (2006.01)
  *G01M 15/14*  (2006.01)
  *G10K 11/16*  (2006.01)
  *F16K 31/00*  (2006.01)
  *F01D 5/26*   (2006.01)
  *G01H 1/00*   (2006.01)

(52) U.S. Cl.
  CPC ......... *F16K 31/1223* (2013.01); *G01M 7/027* (2013.01); *G01M 15/14* (2013.01); *G10K 11/161* (2013.01); *F05D 2260/83* (2013.01); *F05D 2260/96* (2013.01)

(58) Field of Classification Search
  CPC . F16K 31/1223; G01H 1/006; F05D 2260/83; F05D 2260/96
  USPC .......................................................... 73/671
  See application file for complete search history.

(56) References Cited

U.S. PATENT DOCUMENTS

| | | | |
|---|---|---|---|
| 8,973,541 B2* | 3/2015 | Hedman | F16K 31/1225 |
| | | | 123/90.12 |
| 9,347,466 B2* | 5/2016 | Hoglund | F01L 9/02 |
| 9,784,147 B1* | 10/2017 | Harmon, Sr. | F01L 9/04 |
| 9,885,261 B2* | 2/2018 | Hoglund | F01L 9/021 |
| 2015/0184771 A1 | 7/2015 | Chen | |

* cited by examiner

FLUID PULSE DEVICE AND METHOD OF EXCITING GAS TURBINE ENGINE TUROMACHINERY COMPONENTS

BACKGROUND

Gas turbine engine blades are subject to various sources of excitation that may result in both natural modes and aero elastic responses. Engine testing and bench testing are used during gas turbine engine development to assess these modes and responses, as well as the amount of damping available to determine part stability. The engine testing and bench testing may operate the gas turbine engine at pressures and velocities that may induce blade flutter or other aero elastic phenomena that may negatively impact gas turbine engine performance.

The engine testing and bench testing may use shaker tables, airflow rigs, and strain gauged blades to study the dynamics and the actual operating environment. One form of excitation that is used in both engine testing and bench testing is the introduction of pulsed airstreams that emanate from probes positioned and timed to emit air pulses as the blades pass behind the probe. The timing and the accuracy of the delivery of the emitted air pulse is important to artificially excite the blades. The frequency of the emitted air pulse is limited due to the inertia and mechanical valves, or the speed at which the magnetically actuated valve can operate, or other limitations that may limit the frequency of the air pulses.

Accordingly, it is desirable to provide an improved way to provide air pulses to excite turbomachinery with superior timing.

BRIEF DESCRIPTION

In some aspects of the disclosure, a piezo actuated valve is provided. The piezo actuated valve includes a valve body, a tube, a piston assembly, and a piezo injector. The valve body extends along a first axis between a first end and a second end. The valve body defines a first opening that is disposed proximate the first end, a second opening that is disposed proximate the second end, and a valve cavity that is disposed between the first opening and the second opening. The tube extends from the valve body along a second axis that is disposed transverse to the first axis. The piston assembly is disposed within the valve body. The piston assembly includes a piston head and a stem. The piston head is slidably disposed within the valve cavity. The stem extends from the piston head and extends through the second opening. The stem is slidably received within the tube. The piezo injector has an injector tip that extends through the first opening.

In addition to one or more of the features described above, or as an alternative, further embodiments may include a passageway that is defined by the tube and extends between an inlet and an outlet.

In addition to one or more of the features described above, or as an alternative, further embodiments may include, an aperture defined by the stem.

In addition to one or more of the features described above, or as an alternative, the piston assembly is movable between a first position in which the stem inhibits fluid flow through the passageway and a second position in which the aperture is at least partially disposed within the passageway to facilitate fluid flow through the passageway.

In addition to one or more of the features described above, or as an alternative, the piston assembly further comprising a biasing member disposed about the stem configured to bias the piston assembly towards the first position.

In addition to one or more of the features described above, or as an alternative, the piezo injector is configured to selectively provide a fluid pulse to move the piston assembly from the first position towards the second position.

In addition to one or more of the features described above, or as an alternative, the valve body defines a valve seat disposed proximate the first end, the first opening extending through the valve seat.

In addition to one or more of the features described above, or as an alternative, the valve body defines a hard stop disposed opposite the valve seat. The hard stop is configured to engage the piston head to inhibit further travel of the piston head towards the second position.

In addition to one or more of the features described above, or as an alternative, the valve body defines a vent port that radially extends through the valve body and is disposed between the valve seat and the hard stop. The vent port fluidly connects the valve cavity with a drain assembly.

In some aspects of the disclosure, a fluid pulse device is provided. The fluid pulse device includes a piezo actuated valve, a piezo injector, a delivery system, and a control system. The piezo actuated valve has a valve body, a tube, and a piston assembly. The valve body defines a first opening, a second opening, and a valve cavity that is disposed between the first opening and the second opening. The tube extends from the valve body. The piston assembly includes a piston head and a stem that is connected to the piston head. The stem extends through the second opening and defines an aperture. The piezo injector has an injector tip that extends through the first opening. The delivery system is fluidly connected to the piezo injector. The control system is operatively connected to the piezo injector and is configured to actuate the piezo injector to provide a fluid pulse.

In addition to one or more of the features described above, or as an alternative, the tube defines a passageway extending between an inlet fluidly connected to a fluid source and an outlet that faces towards a component of a gas turbine engine.

In addition to one or more of the features described above, or as an alternative, the piston assembly is movable between a first position in which the stem inhibits fluid flow through the passageway and a second position in which the aperture is at least partially disposed within the passageway to facilitate fluid flow through the passageway to the component of the gas turbine engine.

In addition to one or more of the features described above, or as an alternative, the piston assembly further includes a biasing member that engages the piston head and a spring seat that is defined by the valve cavity, to bias the piston assembly towards the first position.

In addition to one or more of the features described above, or as an alternative, in response to the control system providing an activation signal to the piezo injector, the piezo injector provides the fluid pulse to the piston head to move the piston assembly from the first position towards the second position.

In addition to one or more of the features described above, or as an alternative, the valve body defines a vent port that fluidly connects the valve cavity with a drain assembly when the piston assembly is disposed proximate the second position.

In addition to one or more of the features described above, or as an alternative, the activation signal is based on at least one of a rotational speed of a gas turbine engine speed and a condition of the gas turbine engine.

In addition to one or more of the features described above, or as an alternative, the piezo injector has an operating frequency up to 3000 Hz.

In addition to one or more of the features described above, or as an alternative, the delivery system is configured to provide a high pressure working fluid to the piezo injector.

In some aspects of the disclosure, a method of exciting gas turbine engine turbomachinery components is provided. The method includes providing a piezo actuated valve having a valve body that defines a valve cavity that is disposed between a first opening and a second opening, a tube that extends from the valve body that defines a passageway that extends between an inlet and an outlet, a piston assembly that is disposed within the valve cavity having a piston head and a stem that extends from the piston head and through the second opening. The stem defines an aperture. The piezo injector has an injector tip that extends through the first opening.

In addition to one or more of the features described above, or as an alternative, further embodiments may include positioning the outlet of the tube proximate a component of a gas turbine engine.

In addition to one or more of the features described above, or as an alternative, further embodiments may include actuating the piezo injector.

In addition to one or more of the features described above, or as an alternative, further embodiments may include providing a fluid pulse to piston head of the piston assembly.

In addition to one or more of the features described above, or as an alternative, further embodiments may include moving the piston assembly between a first position in which the stem inhibits fluid flow through the passageway and a second position in which the aperture is at least partially disposed within the passageway.

In addition to one or more of the features described above, or as an alternative, further embodiments may include pulsing fluid flow through the passageway.

In addition to one or more of the features described above, or as an alternative, further embodiments may include exciting the component of the gas turbine engine.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Referring now to the Figures, where the present disclosure will be described with reference to specific embodiments, without limiting same, it is to be understood that the disclosed embodiments are merely illustrative and may be embodied in various and alternative forms. The Figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
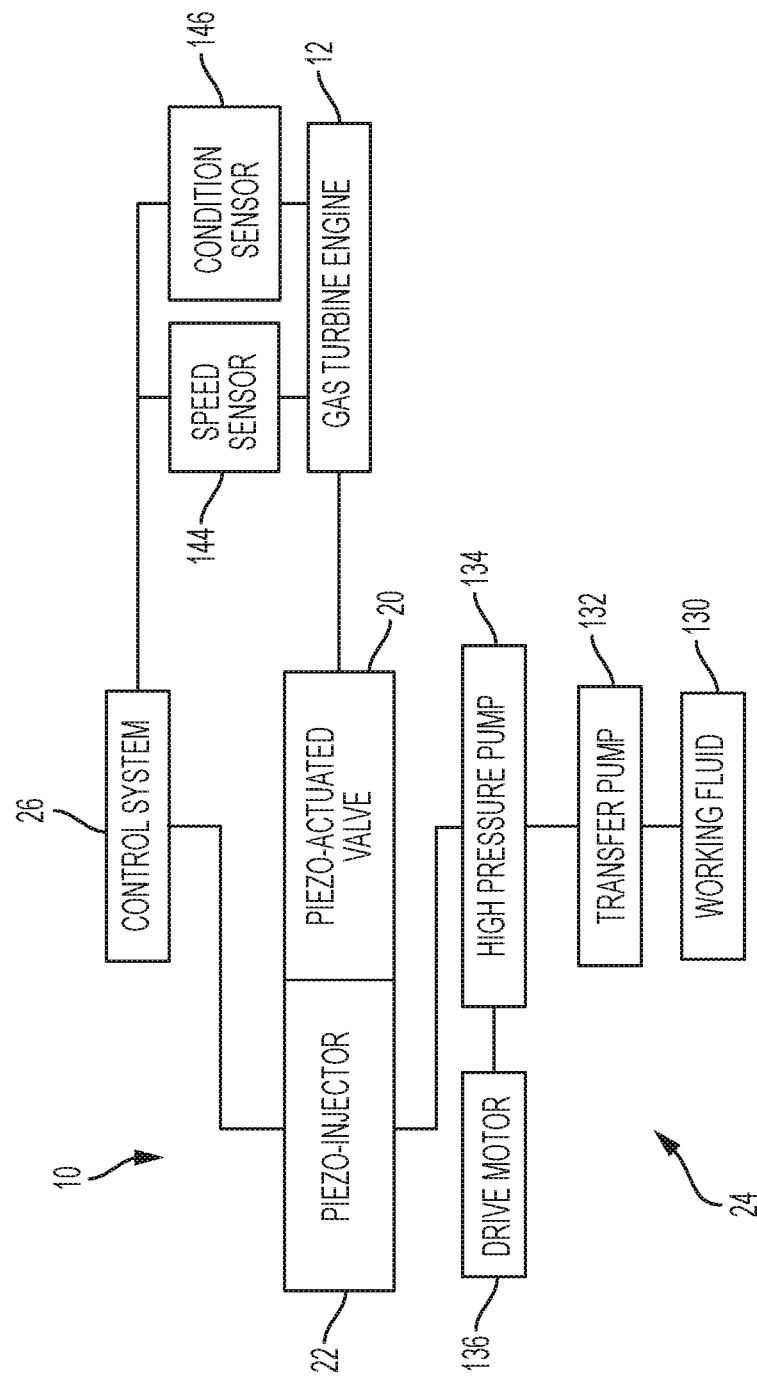
FIG. 1 is a schematic of an fluid pulse device for exciting gas turbine engine turbomachinery blades.

Referring to FIG. 1 a schematic of a fluid pulse device 10 for exciting gas turbine engine turbomachinery components such as a blade, stator, tube, heat shield etc. is shown. The fluid pulse device 10 is provided as part of test equipment to assess or determine natural modes in aero elastic responses of at least one blade of a gas turbine engine 12. The fluid pulse device 10 is capable of precisely actuating a valve to pulse a stream of a fluid (e.g. air) that is directed towards at least one blade of a gas turbine engine at frequencies up to 3000 Hz. The fluid pulse device 10 includes a piezo actuated valve 20, a piezo injector 22, a high pressure delivery system 24, and a control system 26.

Figure 2:
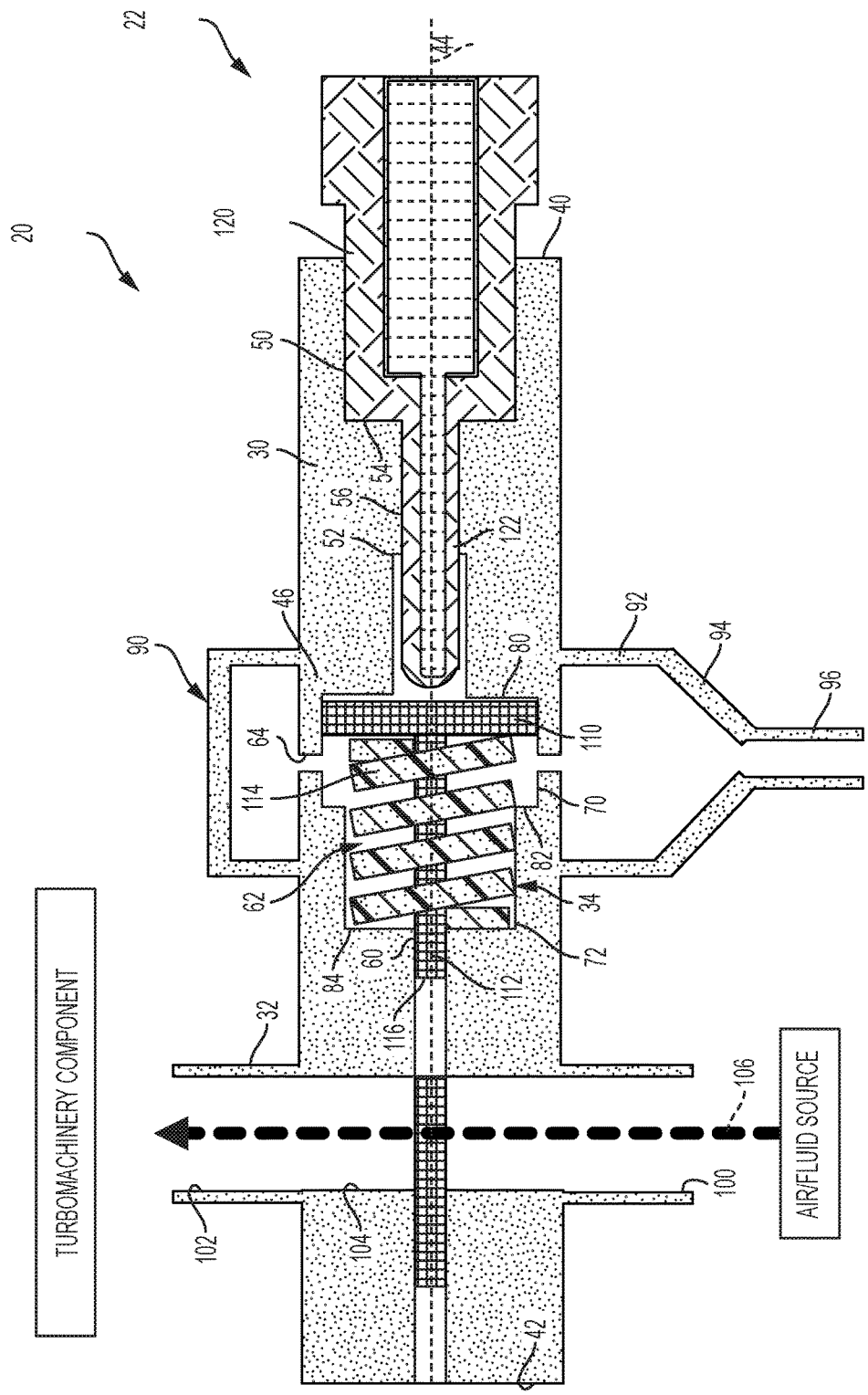
FIG. 2 is a partial cross-sectional view of a piezo actuated fluid valve in a first position.

Referring to FIG. 2, the piezo actuated valve 20 includes a valve body 30, a tube 32, and a piston assembly 34 enclosed within the valve body 30. The valve body 30 extends between a first end 40 and a second end 42 along a first axis 44. In at least one embodiment, the valve body 30 has a diameter of approximately 0.75 inches (19.1 mm). The valve body 30 includes a central region 46 that is disposed between the first end 40 and the second end 42.

The valve body 30 defines a first counterbore 50 and a first opening 52. The first counterbore 50 extends from the first end 40 towards the second end 42. The first counterbore 50 has a first diameter. The first counterbore 50 includes a seating surface 54 that is substantially flat and disposed transverse to the first axis 44. In at least one embodiment, an elongate opening 56 extends from the seating surface 54 towards the first opening 52. The elongate opening 56 connects the first counterbore 50 with the first opening 52. The elongate opening 56 has a second diameter. The second diameter is less than the first diameter.

The first opening 52 is disposed proximate the first end 40. The first opening 52 is configured as an elongate opening that extends from an end of the elongate opening 56 towards the central region 46 of the valve body 30. The first opening 52 and has a third diameter. The third diameter is greater than the second diameter and is less than the first diameter.

The valve body 30 further defines a second opening 60, a valve cavity 62, and a vent port 64. The second opening 60 extends from the second end 42 towards the first end 40. The second opening 60 is configured as an elongate opening that extends through the tube 32. The second opening 60 is spaced apart from the first opening 52 by the valve cavity 62. The second opening 60 has a fourth diameter that is less than the third diameter. The piston assembly 34 inhibits a fluid communication between the second opening 60 and the first opening 52.

The valve cavity 62 is disposed between the first opening 52 and the second opening 60. The valve cavity 62 includes a first portion 70 and a second portion 72. The first portion 70 is disposed proximate the first opening 52.

The first portion 70 is configured as a second counterbore that defines a valve seat 80 and a hard stop 82. The valve seat 80 is disposed substantially parallel to the seating surface 54 and is disposed substantially perpendicular to the first axis 44. The first opening 52 extends through the valve seat 80. The hard stop 82 is disposed opposite the valve seat 80. The hard stop 82 is disposed substantially parallel to the seating surface 54 and the valve seat 80. The hard stop 82 is disposed substantially perpendicular to the first axis 44.

The second portion 72 extends from the hard stop 82 towards the second opening 60. The second portion 72 is disposed proximate the second opening 60. The second portion 72 is configured as a third counterbore that defines a spring seat 84. The spring seat 84 is disposed substantially parallel to the hard stop 82, the valve seat 80, and the seating surface 54. The spring seat 84 is disposed substantially perpendicular to the first axis 44. The second opening 60 extends through the spring seat 84.

The vent port 64 extends radially through the valve body 30. The vent port 64 is disposed between the first opening 52 and the second opening 60. The vent port 64 extends radially through the first portion 70 of the valve cavity 62. In at least one embodiment, a second vent port that is circumferentially spaced apart from the vent port 64 is provided.

The vent port 64 fluidly connects the first portion 70 of the valve cavity 62 with a drain assembly 90. The drain assembly 90 includes a main body 92, a funnel 94, and a drain tube 96. The main body 92 is connected to the valve body 30 and defines a hollow cavity. The main body 92 extends about the valve body 30. The funnel 94 extends from the main body 92 and connects the main body 92 with the drain tube 96. The drain assembly 90 is spaced apart from the tube 32.

The tube 32 is disposed proximate the second end 42 of the valve body 30. The tube 32 extends from the valve body 30. In at least one embodiment, the tube 32 extends through the valve body 30. The tube 32 defines an inlet 100 and an outlet 102 that are fluidly connected to each other by a passageway 104. The passageway 104 extends along a second axis 106 that is disposed substantially transverse to the first axis 44.

The inlet 100 is connected to a fluid source. The fluid source may be a plenum at a pressure of 125 psi or more. The outlet 102 is positioned proximate and faces towards a blade of the gas turbine engine 12. Air or fluid provided by the fluid source flows through the inlet 100 through the passageway 104 to the outlet 102 and ultimately to the blade of the gas turbine engine 12.

Figure 3:
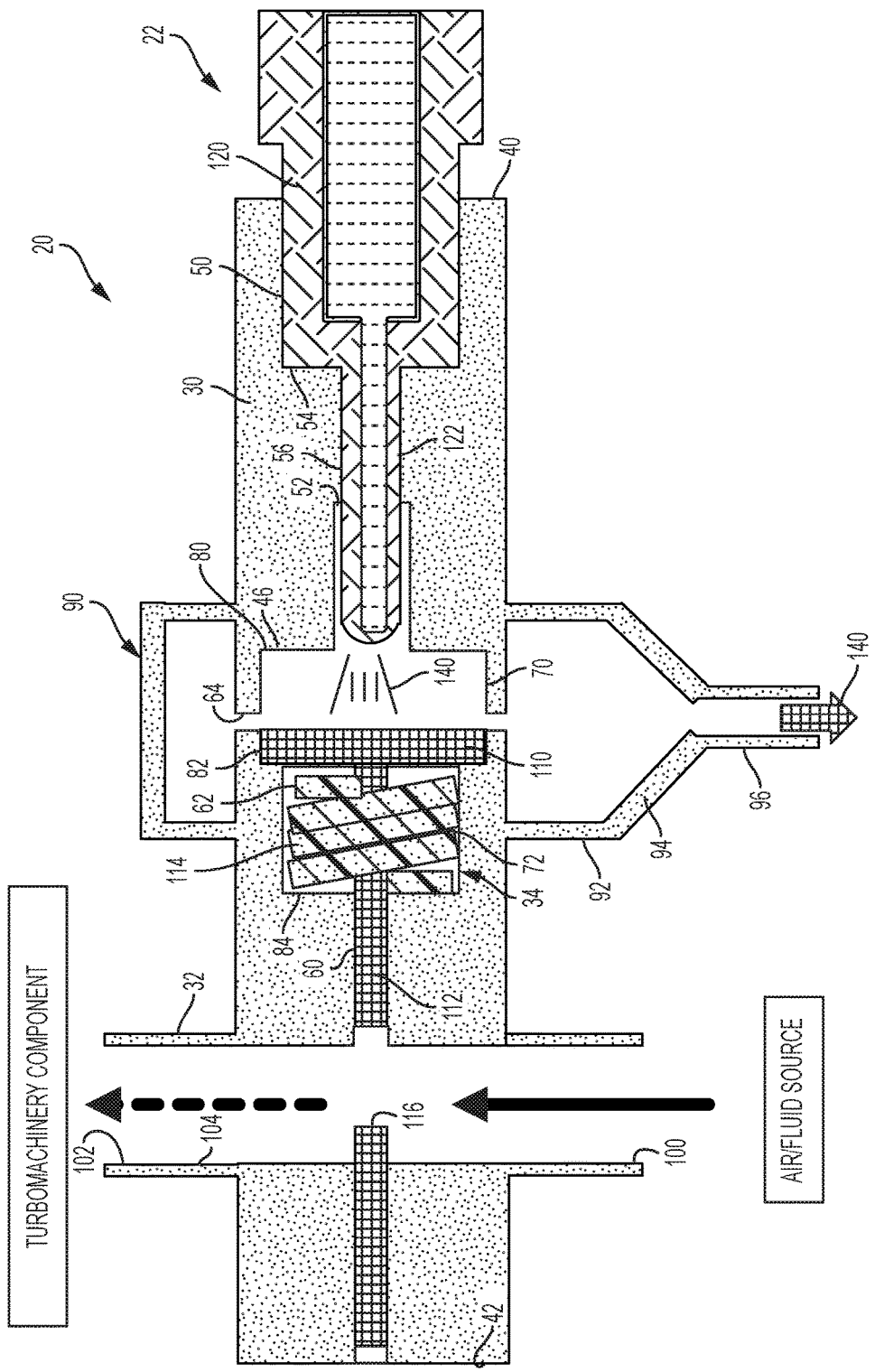
FIG. 3 is a partial cross-sectional view of the piezo actuated fluid valve in a second position.

The piston assembly 34 is movably disposed within the valve body 30 between a first position, as shown in FIG. 2, and a second position, as shown in FIG. 3 to facilitate fluid flow through the passageway 104 of the tube 32. The movement of the piston assembly 34 within the valve body 30 affects the fluid flow through the passageway 104 of the tube 32 such that a cross-section of the passageway 104 is selectively opened and at least partially closed to pulse or chop the fluid flow that is delivered to the blade of the gas turbine engine 12.

The piston assembly 34 includes a piston head 110, a stem 112, and a biasing member 114. The piston head 110 is movably disposed within the first portion 70 of the valve cavity 62 of the valve body 30. The piston head 110 is disposed proximate the valve seat 80 or is configured to engage the valve seat 80 when the piston assembly 34 is in the first position, see FIG. 2. The piston head 110 is disposed proximate the hard stop 82 or is configured to engage the hard stop 82 when the piston assembly 34 is in the second position, see FIG. 3. The hard stop 82 is configured to inhibit further motion of the piston head 110 towards the second end 42.

The stem 112 is connected to the piston head 110 and extends through the second opening 60 and the passageway 104 of the tube 32. The stem 112 defines an aperture 116 such that the stem 112 is configured as a gate valve that selectively inhibits and facilitates flow through the passageway 104 of the tube 32. The aperture 116 is spaced apart from the passageway 104 of the tube 32 and the stem 112 inhibits fluid flow through the passageway 104 when the piston assembly 34 is in the first position. The aperture 116 is at least partially received within the passageway 104 of the tube 32 and facilitates fluid flow through the passageway 104 and the piston assembly 34 is in the second position. In at least one embodiment, the aperture 116 has a diameter of approximately 0.25 inches (6.35 mm).

The biasing member 114 is disposed about the stem 112 and extends between the spring seat 84 of the second portion 72 of the valve cavity 62 of the valve body 30 and an underside of the piston head 110. The biasing member 114 is configured to bias the piston assembly 34 towards the first position.

The piezo injector 22 is operatively connected to the valve body 30. The piezo injector 22 is configured to provide a fluid pulse that moves the piston assembly 34 from the first position towards the second position to move the piezo actuated valve 20 between from a closed position towards a closed position and the biasing member 114 biases the piezo actuated valve 20 from the open position towards the closed position to affect fluid flow through the passageway 104 of the tube 32. The piezo injector 22 provides a fluid pulse at an operating frequency up to 3000 Hz. The piezo injector 22 enables the piezo actuated valve 20 to function as a high speed, accurate, electronically controlled valve.

The piezo injector 22 includes an injector body 120 and an injector tip 122. The injector body 120 extends into the first counterbore 50 and abuts the seating surface 54. The injector tip 122 extends from the injector body 120 and extends through the elongate opening 56 and the first opening 52. The injector tip 122 includes a pintle or a valve that is selectively opened and closed by a piezo element to control delivery of the fluid pulse to the piston assembly 34.

The piezo injector 22 is fluidly connected to the high pressure delivery system 24 and is operatively connected to the control system 26. The high pressure delivery system 24 is configured to provide a high pressure working fluid such as air, a gas/fluid, or a liquid to the piezo injector 22. The high pressure delivery system 24 is configured to transfer a working fluid 130 via a transfer pump 132 to a high pressure pump 134 that is driven by a drive motor 136 to increase the operating pressure of the high pressure working fluid 130 that is supplied to the piezo injector 22. In at least one embodiment, a high pressure rail is disposed between the high pressure pump 134 and an inlet of the piezo injector 22 to deliver the high pressure working fluid 130 to the piezo injector 22.

The control system 26 is configured to selectively excite or actuate the pintle or the valve of the piezo injector 22 to provide a high pressure fluid pulse 140 to the piston assembly 34. The high pressure fluid pulse 140 may be provided at working pressure of 179,263 kPa (26,000 psi) or within a range of 100,000 kPa (15,000 psi) to 200,000 kPa (29,000 psi). The high pressure fluid pulse 140 engages the piston head 110 and moves the piston assembly 34 from the first position towards the second position. The vent port 64 fluidly connects the first portion 70 of the valve cavity 62 with the drain assembly 90 when the piston assembly 34 is disposed proximate the second position. The drain assembly 90 directs the high pressure fluid pulse 140 to the drain tube 96 such that the high pressure fluid pulse 140 does not enter the second portion 72 of the valve cavity 62 or the passageway 104 of the tube 32. The diameter of the piston head 110 and the stroke of the piston head 110 or the piston assembly 34 is sized to accommodate the volume of the working fluid delivered by a single pulse of the piezo injector 22 so as to produce a full stroke of the piston assembly 34 within an intended flow rate range of the piezo injector 22.

The control system 26 is in communication with a speed sensor 144 and a condition sensor 146. The speed sensor 144 is configured to provide a signal indicative of a rotational speed of the gas turbine engine 12 to the control system 26. In at least one embodiment, the speed sensor 144 is configured to provide a signal indicative of a rotational speed of a blade of the gas turbine engine 12 to the control system 26. The speed sensor 144 may be a variable reluctance sensor, a Hall effect sensor, an eddy current sensor, a radar sensor, a light sensor, a LIDAR sensor, an accelerometer, or the like.

The condition sensor 146 is configured to provide a signal indicative of a condition of the gas turbine engine 12 or a blade of the gas turbine engine 12. The condition may be a vibratory motion of the blade, oscillatory motion of the blade, a temperature of the gas turbine engine 12, stage pressure of the gas turbine engine 12, force applied to the blade, or the like. The condition sensor 146 may be an optical sensor, a strain gauge, a cool light sensor, a pressure pad, a high-speed camera system, or the like.

The control system 26 is configured to provide an activation signal to the Piezo injector 22 that is based on at least one of the signal indicative of the rotational speed of the gas turbine engine 12 and the signal indicative of the condition of the gas turbine engine 12 or the blade of the gas turbine engine 12. The activation signal controls the volume, timing, duration, width, amount of energy imparted, or the like of the high pressure fluid pulse 140.

The fluid pulse device 10 is provided with a test system that tests the dynamic stability of a blade of a gas turbine engine 12. The outlet 102 of the tube 32 of the piezo actuated valve 20 is positioned proximate a blade of gas turbine engine 12. The gas turbine engine 12 may be operated at a predetermined rotational speed and the piezo injector 22 may be selectively actuated by the control system 26. The piezo injector 22 provides a fluid pulse or multiple fluid pulses during a predetermined time period(s) to the piston head 110 of the piston assembly 34. The piston assembly 34 is moved between the first position and the second position such that the aperture 116 of the stem 112 moves in and out of the passageway 104 of the tube 32. The motion of the aperture 116 of the stem 112 within the passageway 104 opens or closes the passageway 104 to pulse or chop the fluid flow that is provided through the passageway 104 such that the air provided to the blade of the gas turbine engine 12 is pulsed or has a sine wave component to excite the blade of the gas turbine engine 12.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the scope of the present disclosure. Additionally, while various embodiments of the present disclosure have been described, it is to be understood that aspects of the present disclosure may include only some of the described embodiments or further combinations of the described embodiments. Accordingly, the present disclosure is not to be seen as limited by the foregoing description, but is only limited by the scope of the appended claims.

The invention claimed is:

1. A piezo actuated valve provided with a fluid pulse device, comprising:
    a valve body extending along a first axis between a first end and a second end, the valve body defining a first opening disposed proximate the first end, a second opening disposed proximate the second end, and a valve cavity disposed between the first opening and the second opening;
    a tube extending from the valve body along a second axis disposed transverse to the first axis;
    a piston assembly disposed within the valve body comprising:
        a piston head slidably disposed within the valve cavity; and
        a stem extending from the piston head and extending through the second opening and slidably received within the tube; and
    a piezo injector having an injector tip extending through the first opening.

2. The piezo actuated valve of claim 1, wherein the tube defines a passageway extending between an inlet and an outlet.

3. The piezo actuated valve of claim 2, wherein the stem defines an aperture.

4. The piezo actuated valve of claim 3, wherein the piston assembly is movable between a first position in which the stem inhibits fluid flow through the passageway and a second position in which the aperture is at least partially disposed within the passageway to facilitate fluid flow through the passageway.

5. The piezo actuated valve of claim 4, wherein the piston assembly further comprising a biasing member disposed about the stem configured to bias the piston assembly towards the first position.

6. The piezo actuated valve of claim 5, wherein the piezo injector is configured to selectively provide a fluid pulse to move the piston assembly from the first position towards the second position.

7. The piezo actuated valve of claim 6, wherein the valve body defines a valve seat disposed proximate the first end, the first opening extending through the valve seat.

8. The piezo actuated valve of claim 7, wherein the valve body defines a hard stop disposed opposite the valve seat, the hard stop configured to engage the piston head to inhibit further travel of the piston head towards the second position.

9. The piezo actuated valve of claim 8, wherein the valve body defines a vent port radially extending through the valve body and disposed between the valve seat and the hard stop, the vent port fluidly connects the valve cavity with a drain assembly.

10. A fluid pulse device, comprising:
    a piezo actuated valve having
        a valve body defining a first opening, a second opening, and a valve cavity disposed between the first opening and the second opening,
        a tube extending from the valve, the tube defines a passageway extending between an inlet fluidly connected to a fluid source and an outlet that faces towards a component of a gas turbine engine, and
        a piston assembly that includes a piston head and a stem connected to the piston head, the stem extending through the second opening and defining an aperture;
    a piezo injector having an injector tip extending through the first opening;
    a delivery system fluidly connected to the piezo injector; and
    a control system operatively connected to the piezo injector, configured to actuate the piezo injector to provide a fluid pulse,
    the piston assembly is movable between a first position in which the stem inhibits fluid flow through the passageway and a second position in which the aperture is at least partially disposed within the passageway to facilitate fluid flow through the passageway to the component of the gas turbine engine.

11. The fluid pulse device of claim 10, wherein the piston assembly further includes a biasing member that engages the piston head and a spring seat defined by the valve cavity, to bias the piston assembly towards the first position.

12. The fluid pulse device of claim 11, wherein in response to the control system providing an activation signal to the piezo injector, the piezo injector provides the fluid pulse to the piston head to move the piston assembly from the first position towards the second position.

13. The fluid pulse device of claim 12, wherein the valve body defines a vent port that fluidly connects the valve cavity with a drain assembly when the piston assembly is disposed proximate the second position.

14. The fluid pulse device of claim 12, wherein the activation signal is based on at least one of a rotational speed of a gas turbine engine speed and a condition of the gas turbine engine.

15. The fluid pulse device of claim 12, wherein the piezo injector has an operating frequency up to 3000 Hz.

16. The fluid pulse device of claim 10, wherein the delivery system is configured to provide a high pressure working fluid to the piezo injector.

17. A method, comprising:
providing a piezo actuated valve having a valve body defining a valve cavity disposed between a first opening and a second opening, a tube extending from the valve body defining a passageway extending between and inlet and an outlet, a piston assembly disposed within the valve cavity having a piston head and a stem extending from the piston head and through the second opening, the stem defining an aperture, and a piezo injector having an injector tip extending through the first opening;
positioning the outlet of the tube proximate a component of a gas turbine engine
actuating the piezo injector;
providing a fluid pulse to piston head of the piston assembly;
moving the piston assembly between a first position in which the stem inhibits fluid flow through the passageway and a second position in which the aperture is at least partially disposed within the passageway;
pulsing fluid flow through the passageway; and
exciting the component of the gas turbine engine.

* * * * *